Figure 1:
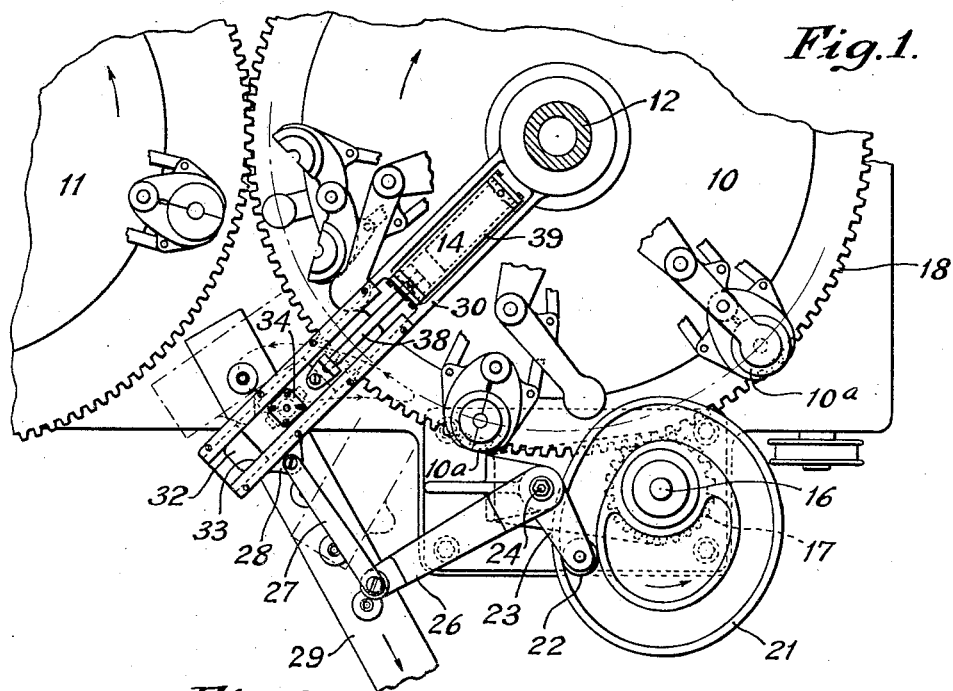

Nov. 22, 1932.                T. WAUGH, JR                    1,888,440
                         OSCILLATING GLASSWARE TRANSFER
                            Filed Oct. 22, 1929

Witness:
A. A. Horn

Inventor
Thomas Waugh, Jr.
by Brown & Packard
Attorneys

Patented Nov. 22, 1932

1,888,440

UNITED STATES PATENT OFFICE

THOMAS WAUGH, JR., OF WEST HARTFORD, CONNECTICUT, ASSIGNOR TO HARTFORD-EMPIRE COMPANY, OF HARTFORD, CONNECTICUT, A CORPORATION OF DELAWARE

OSCILLATING GLASSWARE TRANSFER

Application filed October 22, 1929. Serial No. 401,422.

This invention relates to glassware handling apparatus and more particularly to apparatus of that type adapted to transfer articles of glassware from a continuously rotating mold table to a continuously moving conveyor.

An object of the invention is to provide a take-out or transfer for use with a continuously rotating mold table, which is adapted to pick up glass articles from the table and deposit them upon a continuous conveyor, the transfer mechanism picking up the articles while moving with the table, and depositing them while moving with the conveyor to the end that the articles are not injured by the pick-up and may be set up properly upon the conveyor.

The invention comprises in combination with a continuously rotating mold table, a glassware conveyor and a take-out or transfer mechanism which picks up the ware from the mold table and places it upon the conveyor, of a mechanism to move the pick-up device in coincidence first with the movement of ware on the mold table and then with the conveyor upon which the ware is deposited.

In the drawing,

Fig. 1 is a plan view of the preferred embodiment of my invention; and

Figure 2:
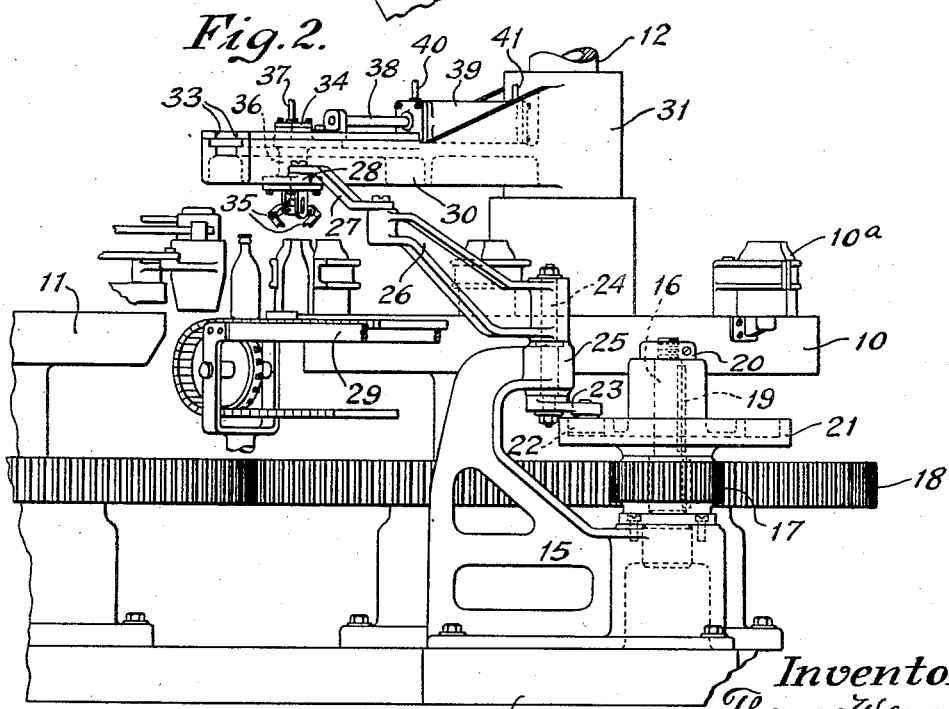

Fig. 2 an elevation thereof.

A continuously rotating finishing mold table 10 of any preferred construction is rotated about a fixed vertical column 12 over a base 13. The table 10 carries a series of blow molds 10a provided with the usual automatically operated means for opening and closing the molds at suitable times. In the type of machine illustrated, these molds receive a parison from an associated blank mold table 11 and give the ware its final shape. As they approach a definite selected position, after the ware has been fully blown, the molds are opened and the ware is removed therefrom by a take-out or transfer mechanism. Such a mechanism is indicated at 14, which is mounted to oscillate about the column 12.

The transfer mechanism comprises an arm or carrier 30, the inner end of which comprises a collar 31 rotatably mounted on the column 12. The outer end of the carrier 30 is provided with a slot 32 and slideways 33 in which the take-out head 34 is mounted for movement radially of the table 10. The head 34 comprises a suitable bracket carrying tongs 35 and an air cylinder 36 provided with suitable connections 37 for opening and closing the tongs. The head 34 is attached to and moved radially of the table by the rod 38 of a piston mounted in an air cylinder 39, which cylinder has suitable air connections 40 and 41 through which air may be alternately introduced to and exhausted from the chambers on either side of the piston. It is to be understood that the air delivered to the cylinders 36 and 39 may be brought from any suitable source and is timed from suitable timing mechanism, not shown, but which is well known in the art.

The transfer mechanism 14, as a whole, may be oscillated about the column 12 by the following mechanism:

Mounted on the base 13 is a bracket 15, which carries rotatably mounted thereon a vertical shaft 16. Fixed to the shaft 16 is a gear 17 so located that it will mesh with the gear 18 of mold table 11, and thus impart rotative movement to the shaft 16. Mounted on the shaft 16 above the gear 17 by a key 19 and a lock nut 20 is a cam 21, which cam acts on a cam roller 22 carried by an arm 23, which is fixedly attached to one end of a shaft 24 mounted through a vertical bearing 25 in the upper end of the bracket 15. Fixedly attached to the other end of shaft 24 is an arm 26, the arms 23 and 26, and shaft 24 forming in effect a bell crank lever. This lever is attached by a connecting rod 27 to a bracket 28 on the transfer mechanism 14.

A continuous conveyor 29 is located adjacent the mold table and may be driven at the desired speed from any suitable source. This speed is preferably the same as that imparted to the transfer device by the cam 21 during the time that the ware is being deposited on the conveyor.

It will be evident that when the table 10 is rotated, the cam 21 will be rotated and an oscillating motion, defined by the shape of the cam, imparted to the transfer mechanism 14. The cam 21 in combination with the reciprocatory movement of the tongs mechanism causes the tongs to travel over the path illustrated by the broken line and arrows in Fig. 1.

As is indicated, the tongs move in coincidence with the mold table during a portion of its rotative movement and in coincidence with the conveyor during a portion of its movement. The tong mechanism is referred to herein and in the claims as moving "in coincidence" with the mold or mold table over the ware and with the conveyor. While, as is obvious, the tongs are not strictly "in coincidence" in the sense that they travel through precisely the same path, the paths are in the same vertical planes and it is in this sense that the word "coincidence" is used in referring to the operation of the tongs.

As it is well known how to time the tongs to pick up and release an article of glassware at any desired time, it is not deemed necessary to do more than note that the preferred timing of operation of the tongs mechanism is to pick up the article when the tongs are moving in coincidence with the movement of the table and deposit the article when the tongs are moving in coincidence with the conveyor.

Since it is possible by varying the cam 21 to change the speed at which the tongs are moved through that instrumentality, and by varying the time of application of air to and from the cylinders to regulate the time and character of the movement of the tongs radially of the table, it follows that my invention may be readily adapted to various machine operations for use with various types of ware. It is obviously possible to select and apply to the tongs a cycle and path of movement best suited to pick up the ware while the molds and tongs are travelling through coincident paths and at the same speeds, to remove the ware in a manner causing least deformation of the article and to then deposit it while the ware and conveyor are moving in the same direction and at the same speed.

It is obvious that, although the invention is shown in its preferred form as moving ware from a two table continuously rotating forming machine to a conveyor, it is capable of being applied to many other types of machines where it is desirable to move a transfer device in coincidence with two different moving machines. The described embodiments of the invention are for illustrative purposes only and various modifications may be made therein without departing from the spirit and scope of the invention, as defined in the appended claims.

For my invention I claim:

1. In glassware handling machinery in combination with a continuously rotating mold table and a plurality of molds thereon, a glassware transfer device mounted axially of said table, a conveyor located adjacent the mold table, and means for alternately moving the transfer device a finite distance above a mold, and a finite distance above the conveyor and in coincidence therewith.

2. In glassware handling machinery in combination, a continuously rotating mold table, glassware forming molds mounted thereon, a conveyor, a glassware transfer device coaxially mounted above the mold table, a cam actuated by the mold table, linkage between the cam and the transfer device whereby the transfer device is moved in coincidence first with a mold and then in coincidence with the conveyor.

3. In glassware handling machinery in combination, a conveyor, means for continuously moving the conveyor in a rectilinear path, a mold table, molds mounted thereon, means for continuously rotating the molds, a transfer device, means for moving the transfer device with the mold for a finite distance about the axis of rotation of the molds, and means for moving the transfer device for a finite distance in coincidence with the conveyor.

4. In glassware handling machinery, the combination of two continuously moving surfaces, a glassware transfer device, a member for supporting said device above one of said surfaces for oscillation about the center thereof, and means for operating said member to alternately move said device a finite distance in coincidence with each of said surfaces.

5. In glassware handling machinery in combination a continuously rotating mold table, a continuously moving conveyor, a glassware transfer device, means for supporting the said device for oscillatory movement above the mold table and the conveyor respectively, a moving cam adapted to oscillate said supporting means and transfer device, means for transmitting motion from said cam to the transfer device, and means for shifting the transfer mechanism on its supporting means from above the mold table to a position over the conveyor, the transfer device is moved alternately in coincidence first with the mold table and then with the conveyor in response to the oscillation of the supporting means and the shifting of the transfer device thereon.

6. In glassware handling machinery in combination, a continuously rotating mold table, glassware forming molds mounted thereon, a continuously moving conveyor, a glassware transfer device coaxially mounted above the mold table, a cam mounted adjacent the mold table, means for actuating said cam by the movement of said mold table, and linkage between the cam and the transfer device whereby the transfer device is moved in coincidence first with a mold and then with the conveyor.

7. In glassware handling machinery the combination of a mold table, a plurality of glassware forming molds mounted thereon, means for rotating said table, a glassware transfer device, a support for said device, means for imparting a rectilinear movement to the transfer device relative to said support, and means for imparting an oscillating movement to said support and the transfer device carried thereby, when said table is rotating and in synchronism therewith, to remove articles of glassware from said molds while they are moving.

8. In glassware handling machinery the combination of a mold table, means for rotating said table, a plurality of glassware forming molds mounted thereon, a glassware transfer device coaxially mounted above the mold table, means for imparting a horizontal radial movement to the transfer device, and means operating at the same time as said last named means to impart an oscillating movement to said transfer device, to successively move said transfer device in vertical alignment with each of said molds while they are moved by the rotation of said table, and to remove articles of glassware from the molds.

Signed at Hartford, Connecticut this 17th day of October 1929.

THOMAS WAUGH, Jr.